Jan. 22, 1952  R. C. BARKER  2,582,943
AZIMUTH RING PRINTING STAMP FOR MAPS
Filed March 7, 1949
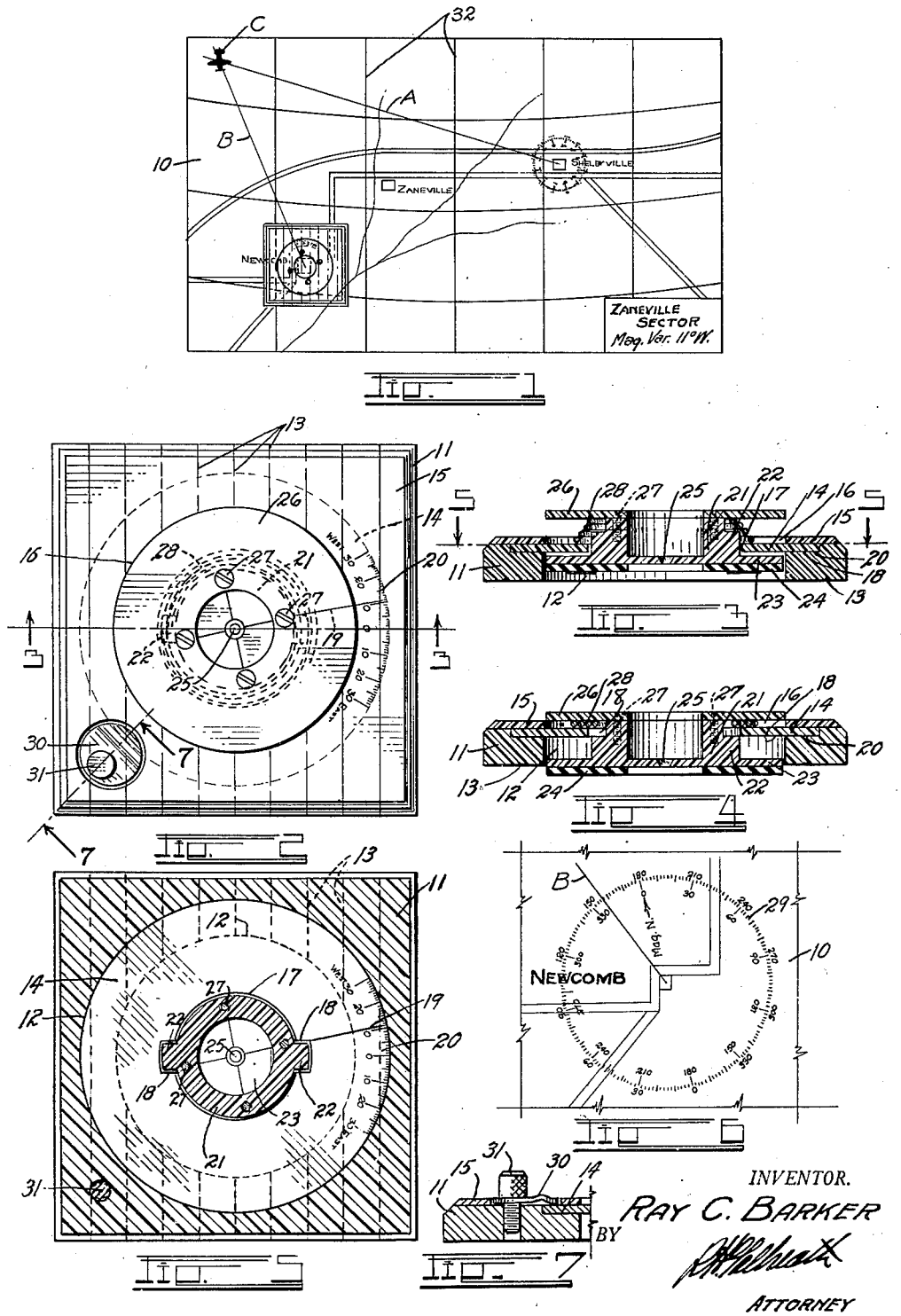
INVENTOR.
RAY C. BARKER
BY
ATTORNEY Patented Jan. 22, 1952

2,582,943

UNITED STATES PATENT OFFICE 2,582,943

AZIMUTH RING PRINTING STAMP FOR MAPS

Ray C. Barker, Denver, Colo.

Application March 7, 1949, Serial No. 80,020

3 Claims. (Cl. 101—373)

1

This invention relates to a rubber stamp, and more particularly to a stamp designed to print a protractor ring or azimuth circle about a selected point upon a map.

Azimuth circles upon an air travel map are printed about the principal air ports upon the map, showing the magnetic compass directions from those ports corrected for the magnetic variation at that particular locality. It would be impractical and highly confusing to place these circles about all points upon the map. Occasionally, however, it becomes necessary for a pilot to orient himself from intermediate points for emergency landings or for landings off the charted travel beams. The bearings to the latter points may be obtained visually over the compass needle, or by radio-compass to available radio broadcasting stations. It is impossible, however, to draw lines on the map from the located control points without azimuth circles about the selected points which have also been corrected for the magnetic needle variation of the particular locality.

The principal object of this invention is to provide a rotatable rubber azimuth stamp with means for aligning the stamp with relation to map meridians and with means for setting off the magnetic variations which can be quickly, easily, and accurately set over a selected point on an air travel map to print a corrected azimuth about that point to enable location lines to be accurately drawn from the selected points, the intersection of which will give the exact location of the plane on the map.

Another object is to provide a rubber stamp which can be moved over a map without smearing the stamp ink thereon, and which can be placed upon an inking pad without danger of inking any portions except the printing faces of the type.

A further object is to provide an air map stamp with a mileage scale so that map distances can be accurately measured on the map by means of the stamp.

A still further object is to provide a transparent air map stamp which will not obscure the portions of the map upon which it is placed, and which can be quickly and accurately centered over selected points on the map.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the improved stamp as it would appear in place upon a conventional air map;

Fig. 2 is an approximately full size plan view of the stamp;

Fig. 3 is a cross-section, taken on the line 3—3, Fig. 2;

Fig. 4 is a similar cross-section, illustrating the stamp in the projected position, ready to be inked;

Fig. 5 is a horizontal section, taken on the line 5—5, Fig. 3;

Fig. 6 is an enlargement of a portion of the air map of Fig. 1, illustrating the type of impression made by the stamp about a selected point upon the map; and Fig. 7 is a detail section, taken on the line 7—7, Fig. 2.

A portion of a typical air map is indicated by the numeral 10 on the drawing, with its north and south meridian lines at 32.

The improved air map stamp is formed from any suitable transparent plastic, such as "lumarith" or the like, and comprises a relatively thick, square, transparent base block 11 having a central stamp opening 12, and provided on its bottom with engraved meridian lines 13 extending parallel to its two side edges. The usual air travel map is drawn to a scale of 1"=15.8 miles, and it is preferred to space the meridian lines on the block 11 at intervals of five map miles, and to form the block 3.164 inches square to correspond to 50 miles on the map. This spacing of the lines 13 and the size of the block make the base block exceedingly useful as a scale for measuring distances on the map.

A rotatable, annular index plate 14 is inset in an annular shoulder depression or counterbore about the top of the stamp opening 12, and is held therein by means of a top plate 15 having a central opening 16 corresponding in size and in alignment with the stamp opening 12 in the block 11. The top plate 15 is cemented or otherwise secured to the top of the block 11 so that the index plate may rotate freely therebeneath. The index plate 14 is provided with a central opening 17 having two oppositely extending key notches 18. It also carries a radially extending index line 19 engraved upon its lower surface.

The base block 11 is provided with a magnetic deflection scale 20 which is engraved in the recess below the index plate 14, and upon which positions are indicated by the index line 19. Both the scale 20 and the line 19 are clearly visible through the transparent top plate 15.

A rotatable center sleeve 21 passes through the central opening of the index plate 14. The sleeve is provided with two oppositely extending keys 22 which normally rest in the key notches 18 in the index plate 14. The keys 22 do not extend completely to the top of the sleeve 21, however, so that if the sleeve is sufficiently depressed, the keys will pass from the notches and the sleeve may be rotated independently of the index plate 14, if desired.

A circular, concentric rubber stamp disc 23 is formed completely across the bottom of the sleeve 21 and projects outwardly thereabout and across the open center thereof. An annular rubber stamp 24 is secured concentrically to the disc 23. The stamp 24 carries degree markings from a north meridian to form a complete 360° azimuth, as shown in Fig. 6. A centering opening 25 is formed through the disc 23 at the exact center of the stamp 24.

A circular top disc 26 is secured upon the top of the sleeve 21 by means of suitable attachment screws 27, or in any other desired manner. This disc 26 has a diameter slightly less than the opening 16 in the top plate 15. A conical compression spring 28 is compressed between the top disc 26 and the index plate 14 to constantly urge the stamp plate 23 upwardly against the index plate 14, as shown in Fig. 3.

The zero or north indication on the azimuth scale 29 is placed so as to be positioned directly below the index line 19 on the index plate 14 when the keys 22 are in the notches 18. The index plate 14 may be locked in any pre-set rotative position by means of a clamping disc 30 which is inset in an opening through the top plate 15 so that it will extend over the peripheral edge of the index plate 14. It can be clamped against the plate 14 by means of a clamp screw 31 which is threaded into the base block 11.

*Operation*

Referring to the map 10 of Fig. 1, let us assume that a pilot takes a bearing to the town of "Shelbyville," and a second bearing to the town of "Newcomb" on the map 10, and that the magnetic compass variation for this particular locality is 11° west. The top disc 26 is rotated to place the index line 19 below the 11° "West" marking on the scale 20, and the scale is locked by means of the screw 31. The centering opening 25 is now placed over the town of "Shelbyville" on the map, with the meridian lines 13 lying on or positioned parallel to the map meridians 32, and the top disc 26 is depressed to print a magnetically corrected azimuth circle around "Shelbyville," as shown in Fig. 1.

The process is now repeated over the town of "Newcomb," as shown in Fig. 1, to produce the azimuth circle thereabout, as shown in Fig. 6. A line is now drawn on the map from "Shelbyville," as indicated by the line "A," and from "Newcomb," as indicated by the line "B." The lines are drawn through the proper positions on the printed protractor circles to correspond to the bearings taken to the towns from the plane. The point where the two lines "A" and "B" intersect on the map gives the position of the plane, as indicated at "C" in Fig. 1.

The stamp 24 may be inked on an ordinary stamp pad. For inking, the top disc 26 is depressed to force the keys 22 out of their notches 18, and the disc is rotated slightly to place the keys 22 below the index plate 14. This locks the stamp 24 below the surface of the block 11, as shown in Fig. 4, so that it may be impressed against a rubber stamp pad without inking the block 11. When inked, the top disc 26 is simply rotated until the keys 22 align with the notches 18 to allow the spring 28 to snap the device back to the working position of Fig. 3.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. An air map stamp comprising: a relatively thick, rectangular base block of transparent material; meridian lines engraved on said block parallel to the two side edges thereof, said lines being visible through said block; a central stamp opening extending vertically through said block; a transparent rotatable index plate inset in a counterbore at the top of said opening; a transparent top plate on said block extending over said index plate to maintain the latter in its counterbore, said top plate and said index plate having centrally positioned openings; a degree scale carried by said block below said index plate so as to be visible through the latter; an indicating line on said index plate over said scale to indicate positions on the latter; and an annular azimuth circle printing stamp mounted concentrically in said openings and arranged to rotate with said index plate.

2. An air map stamp comprising: a relatively thick, rectangular base block of transparent material; meridian lines engraved on said block parallel to the two side edges thereof, said lines being visible through said block; a central stamp opening extending vertically through said block; a transparent rotatable index plate inset in a counterbore at the top of said opening; a transparent top plate on said block extending over said index plate to maintain the latter in its counterbore, said top plate and said index plate having centrally positioned openings; a degree scale carried by said block below said index plate so as to be visible through the latter; an indicating line on said index plate over said scale to indicate positions on the latter; a tubular sleeve passing concentrically through the openings in said top and index plates; a stamp plate on the bottom of said sleeve; an annular rubber stamp carrying an azimuth circle concentrically positioned on the bottom of said stamp plate; a spring urging said stamp plate upwardly; and means for communicating the rotation of said sleeve to said index plate.

3. An air map stamp comprising: a relatively thick, rectangular base block of transparent material; meridian lines engraved on said block parallel to the two side edges thereof, said lines being visible through said block; a central stamp opening extending vertically through said block; a transparent rotatable index plate inset in a counterbore at the top of said opening; a transparent top plate on said block extending over said index plate to maintain the latter in its counterbore, said top plate and said index plate having centrally positioned openings; a degree scale carried by said block below said index plate so as to be visible through the latter; an indicating line on said index plate over said scale to indicate positions on the latter; a tubular sleeve passing concentrically through the openings in said top and index plates; a stamp plate on the bottom of said sleeve; an annular rubber stamp carrying an azimuth circle concentrically positioned on the bottom of said stamp plate; a top disc mounted upon the top of said sleeve; a spring compressed between said top disc and said index plate to urge said stamp upwardly; and keys projecting from said sleeve into receiving notches in said index plate to communicate the rotation of the former to the latter, said keys terminating in spaced relation to said top disc so as to pass from said notches when said sleeve is forced downwardly against the action of said spring so as to allow said sleeve to be rotated independently of said index plate.

RAY C. BARKER.

REFERENCES CITED

The following references are of record in the file of this patent:

UNITED STATES PATENTS

| Number | Name | Date |
|---|---|---|
| 1,249,417 | Kennedy | Dec. 11, 1917 |
| 1,261,587 | Mellor et al. | Apr. 2, 1918 |
| 1,296,929 | Dalziel | Mar. 11, 1919 |
| 1,439,358 | Duncan | Dec. 19, 1922 |